(12) United States Patent
Chou (10) Patent No.: US 9,041,655 B2
(45) Date of Patent: May 26, 2015

(54) DISPLAY METHOD FOR DISTINGUISHING MULTIPLE LINKING TARGETS

(71) Applicant: ZIPPY TECHNOLOGY CORP., New Taipei (TW)

(72) Inventor: Chin-Wen Chou, New Taipei (TW)

(73) Assignee: ZIPPY TECHNOLOGY CORP., New Taipei (TW)

( * ) Notice: Subject to any disclaimer, the term of this patent is extended or adjusted under 35 U.S.C. 154(b) by 193 days.

(21) Appl. No.: 13/919,662

(22) Filed: Jun. 17, 2013

(65) Prior Publication Data

US 2014/0368437 A1 Dec. 18, 2014

(51) Int. Cl.
*G06F 3/02* (2006.01)
*G06F 3/023* (2006.01)

(52) U.S. Cl.
CPC .................................... *G06F 3/0231* (2013.01)

(58) Field of Classification Search
None
See application file for complete search history.

(56) References Cited

U.S. PATENT DOCUMENTS

| 6,522,283 | B1* | 2/2003 | Shiga et al. | 341/176 |
| 7,162,232 | B2* | 1/2007 | Ramakesavan et al. | 455/420 |
| 8,744,353 | B2* | 6/2014 | Hsieh | 455/41.2 |
| 2009/0265749 | A1* | 10/2009 | Yu | 725/116 |
| 2010/0265179 | A1* | 10/2010 | Ram | 345/163 |

* cited by examiner

*Primary Examiner* — Jason Olson
(74) *Attorney, Agent, or Firm* — Muncy, Geissler, Olds & Lowe, P.C.

(57) ABSTRACT

A display method for distinguishing multiple linking target aims to switch data transmission link between an input device and at least two information processing systems through a plurality of transmission channels in a wireless transmission fashion. The input device includes a display module with a first display zone and a second display zone. The display method comprises steps of: detecting linkable information processing systems, setting transmission channels, determining a linking target and displaying information of linked transmission channel. Through the steps of detecting linkable information processing systems, setting transmission channels and determining a linking target, a data transmission link can be established with one of the information processing systems. Users can further display the device identification code through the step of displaying information of linked transmission channel to be informed of the information processing system currently linked to the input device.

13 Claims, 8 Drawing Sheets

DISPLAY METHOD FOR DISTINGUISHING MULTIPLE LINKING TARGETS

FIELD OF THE INVENTION

The present invention relates to a display method for distinguishing multiple linking targets and particularly to a display method to distinguish a linking target through displaying a device identification code.

BACKGROUND OF THE INVENTION

Advance of computer technology has made keyboard a necessary fundamental input device. While many types of computer equipments have been developed the keyboard generally is maintained its fundamental style. However, in order to meet varying users' requirements the size and weight of the keyboard have been greatly reduced in recent years. Foldable and extendable keyboards, and even flexible keyboards that can be rolled and bent also have been developed and marketed. The critical issue that constrains the usability of the keyboard is signal line connection that links the keyboard and computer equipments. The length of the signal line becomes a constraint on use distance and location. To overcome this limitation, keyboards equipped with wireless communication technique have been developed by some producers, such as Bluetooth wireless keyboards, infrared wireless keyboard and the like.

Although the keyboard linked via wireless communication has resolved a lot of problems of the conventional keyboard, a lot of people these days often have many types of information processing systems on hand, such as computers, handsets and tablet computers. If each information processing system is equipped with a wireless keyboard mix-up could occur when in use. Hence some producers have developed a wireless keyboard capable of switching among multiple linking targets. The wireless keyboard can register the linking data of at least two information processing systems at the same time. Through the registered linking data users can freely switch linking between the two information processing systems. However, the present wireless keyboard for switching among multiple linking targets cannot display the current linked information processing system. Even if the wireless keyboard displays a currently chosen transmission channel selection code, the problem of blind switching could still occur. This is mainly caused by user's forgetting the originally setting transmission channel after a period of time that could result in user's switching randomly each transmission channel until a successful link is established. Hence even if the transmission channel selection code is displayed, user still has difficulty to remember the exact information processing system originally set, and the problem of blind switching could still happen.

SUMMARY OF THE INVENTION

The primary object of the present invention is to solve the problem of conventional wireless keyboard of unable to get definite information of the information processing system corresponding to the transmission channel that results in users' doing repetitive blind switching.

To achieve the foregoing object, the invention provides a display method capable of distinguishing multiple linking targets. The method switches data transmission link between an input device and at least two information processing systems through a plurality of transmission channels in a wireless transmission fashion. The input device includes a display module which contains a first display zone and a second display zone. The display method comprises steps of: detecting linkable information processing systems; setting transmission channels; determining a linking target, and displaying information of linked transmission channel. The step of detecting linkable information processing systems is to activate a detection mode for a linking target to detect the linkable information processing systems. The step of setting transmission channels is to get a device identification code and a device authorization code of each information processing system, and set a transmission channel selection code corresponding to the device identification code and device authorization code for reading thereof. The step of determining a linking target is to read the device identification code and device authorization code corresponding to the transmission channel selection code generated by selection of the user, and establish data transmission link between the corresponding transmission channel and information processing system. The step of displaying information of linked transmission channel is to get the generated transmission channel selection code and the corresponding device identification code, and display the transmission channel selection code through the first display zone and display the device identification code through the second display zone.

In one embodiment the step of determining a linking target further includes sub-steps as follows: a) provide a memory reset element on the input device; and b) judge whether the memory reset element is triggered; if positive, delete the device identification codes and device authorization codes registered in the input device and execute anew the step of setting transmission channels; if negative, continue trigger judgment of the memory reset element.

In another embodiment the step of determining a linking target further includes sub-steps as follows: a) provide a memory reset element and a channel selection element on the input device; and b) select the transmission channel selection code through the channel selection element, and judge whether the memory reset element is triggered; if positive, delete the device identification code and device authorization code corresponding to the transmission channel selection code and execute anew the step of setting transmission channels; if negative, continue trigger judgment of the memory reset element.

In yet another embodiment the step of displaying information of linked transmission channel further includes sub-steps as follows: a) provide a status reader on the input device; b) judge whether the status reader is triggered; if positive, read anew the transmission channel selection code linked to the input device to read the corresponding device identification code and proceed the next step; if negative, continue trigger judgment of the status reader; and c) display anew the transmission channel selection code through the first display zone and display anew the device identification code through the second display zone.

In yet another embodiment the step of displaying information of linked transmission channel further includes sub-steps as follows: a) provide a status reader on the input device; b) judge whether the status reader is triggered; if positive, read anew the device identification codes and transmission channel selection codes registered in the input device, and set a link mark for the transmission channel selection code and device identification code linked to the input device; if negative, continue trigger judgment of the status reader; and c) display the transmission channel selection codes and device identification codes respectively through the first display zone and second display zone, and display notably the transmission channel selection code and device identification code corresponding to the link mark.

In yet another embodiment the wireless transmission method is Bluetooth transmission technique.

In yet another embodiment the input device is a keyboard. More specifically, the keyboard includes a keyset, a circuit unit to generate electric signals by depression of the keyset, a micro-control unit connected to the display module and electrically connected to the circuit unit to detect the electric signals, a memory unit electrically connected to the micro-control unit, and a wireless transmission device connected to the micro-control unit. The memory unit stores at least the device identification code, the device authorization code and the corresponding transmission channel selection code. The micro-control unit detects the transmission channel selection code generated by the circuit unit to read the corresponding device identification code and device authorization code from the memory unit. The display module displays the transmission channel selection code and device identification code. The wireless transmission device establishes a data transmission link with the corresponding information processing system through the device identification code and device authorization code corresponding to the transmission channel selection code.

In yet another embodiment the keyboard includes a status reader which incorporates with at least one key of the keyset to make the display module display anew the transmission channel selection code and device identification code.

In yet another embodiment the keyboard includes a memory reset element which incorporates with at least one key of the keyset to delete the device identification codes and device authorization codes registered in the keyboard.

In yet another embodiment the information processing system is a computer or a handset, and more specifically, the computer can be a portable notebook computer.

Through the display method of the invention set forth above, compared with the conventional approach, the invention provides features as follows:

Reads the corresponding device identification code through the transmission channel selection code, and displays the transmission channel selection code on the first display zone and displays the device identification code on the second display zone through the display module. Hence users can be quickly informed of the currently used transmission channel and the linked information processing system.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Please refer to FIGS. 1 through 4, the present invention aims to provide a display method capable of distinguishing multiple linking targets that mainly aims to switch data transmission link between an input device 1 and at least two information processing systems 2 through a plurality of transmission channels in a wireless transmission fashion. The input device 1 includes a keyset 11, a circuit unit 12 to generate electric signals by depression of the keyset 11, a micro-control unit 13 electrically connected to the circuit unit 12 to detect the electric signals, a memory unit 14 electrically connected to the micro-control unit 13, a wireless transmission device 15 connected to the micro-control unit 13 and a display module 16 connected to the micro-control unit 13. The display module 16 has a plurality of display zones 161 and 162 to display different information. In this embodiment the display module 16 includes a first display zone 161 and a second display zone 162 as an example for discussion. The input device 1 can be a keyboard or a mouse, or the like. The display method according to the invention implements wireless transmission with the information processing systems 2 through a Bluetooth transmission technique. The information processing systems 2 can be computers or handsets, or the like. If the computers are chosen, they can be portable notebook computers. In addition, each information processing system 2 contains a device identification code and device authorization code to implement the wireless transmission.

Figure 1:
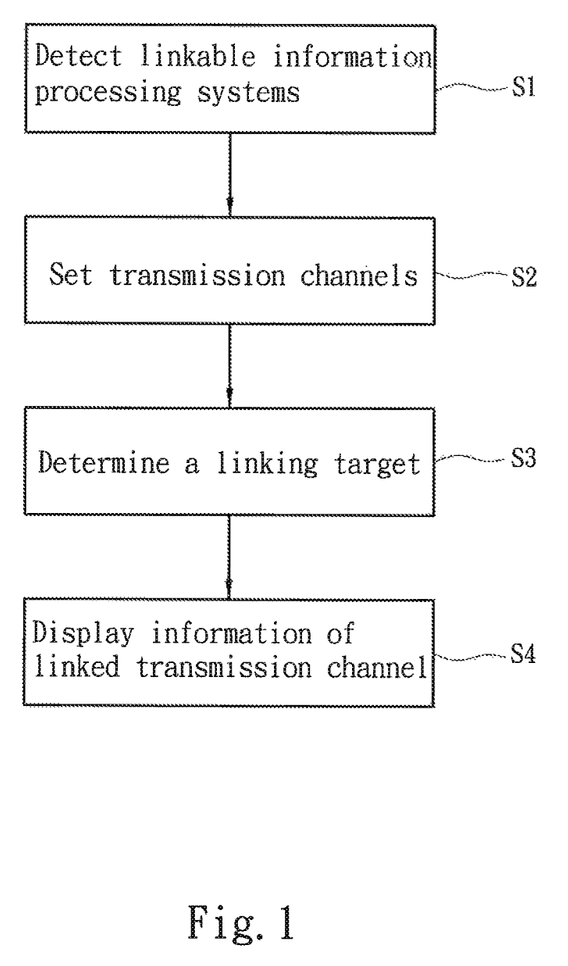
FIG. 1 is a flowchart of a first embodiment of the display method for distinguishing multiple linking targets according to the invention.

The display method according to the invention comprises the following steps:

step S1: detect linkable information processing systems;
step S2: set transmission channels;
step S3: determine a linking target; and
step S4: display information of linked transmission channel.

Figure 2:
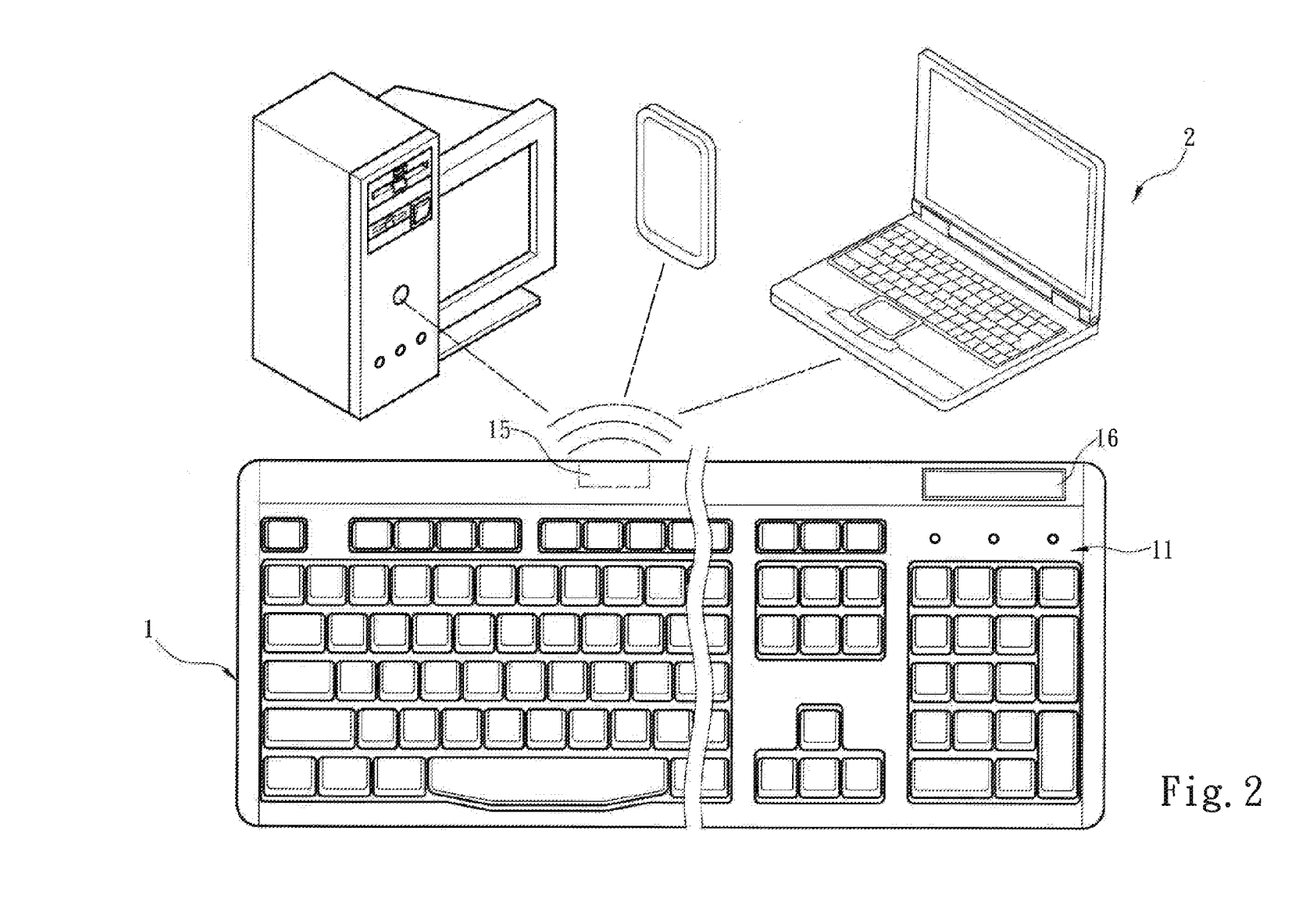
FIG. 2 is a schematic view for implementation of the first embodiment of the invention.
Figure 3:
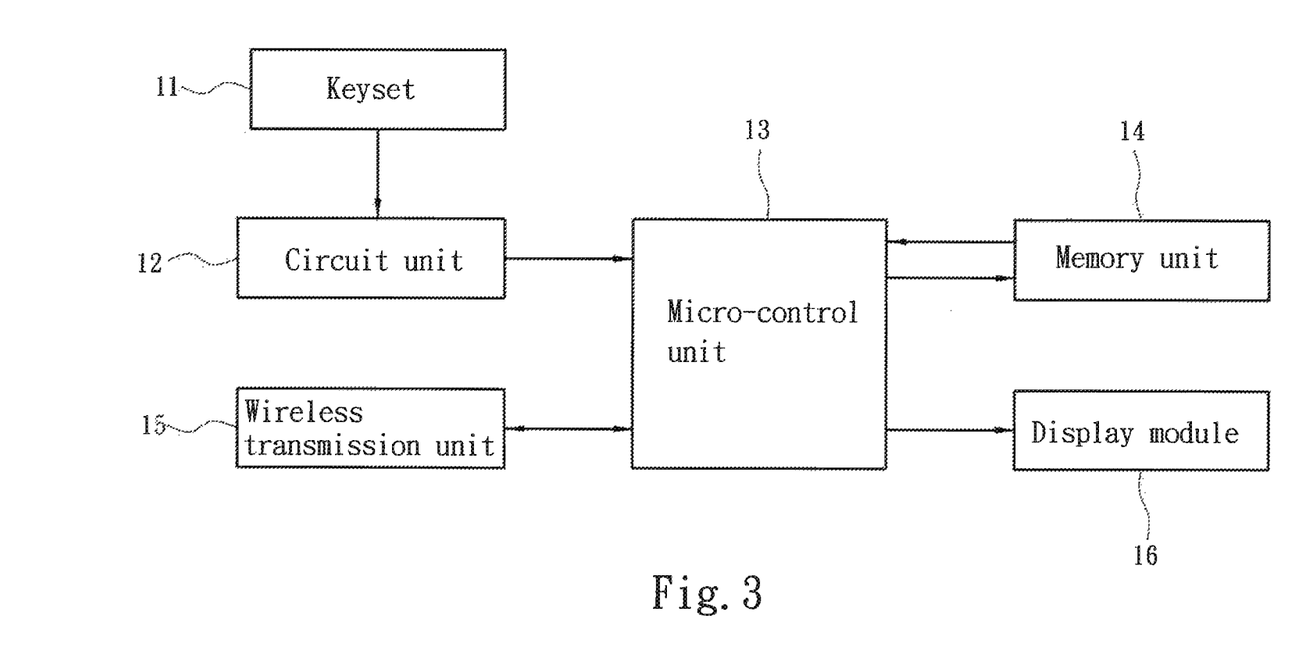
FIG. 3 is a block diagram of input device structure in the first embodiment of the invention.

More specifically, at step S1: activate a detection mode for a linking target through the input device 1 to detect the linkable information processing systems. In this embodiment the input device 1 can perform wireless communication through Bluetooth communication technique. When the input device 1 activates the detection mode, it searches any information processing system 2 which can be linked under wireless communication via the wireless transmission device 15, and enters the step S2 after the search is finished.

At step S2, get the device identification code and device authorization code of each information processing system 2 through the wireless transmission device 15, and set a transmission channel selection code corresponding to the device identification code and device authorization code through the micro-control unit 13 for reading thereof; i.e. each transmission channel selection code can read a corresponding device identification code and a device authorization code corresponding to the device identification code. Furthermore, the micro-control unit 13 can send the transmission channel selection code, device identification code and device authorization code to the memory unit 14 for saving.

Proceed step S3 after step S2 is finished. A user can select to generate a transmission channel selection code according to requirement. More specifically, the user can press one key or multiple keys on the keyset 11 to enable the circuit unit 12 to generate electric signals for generating the transmission channel selection code. The micro-control unit 13 reads the device identification code and device authorization code corresponding to the transmission channel selection code from the memory unit 14, and sends the device identification code and device authorization code to the wireless transmission device 15 to establish data transmission link with the corresponding information processing system 2.

Figure 4:
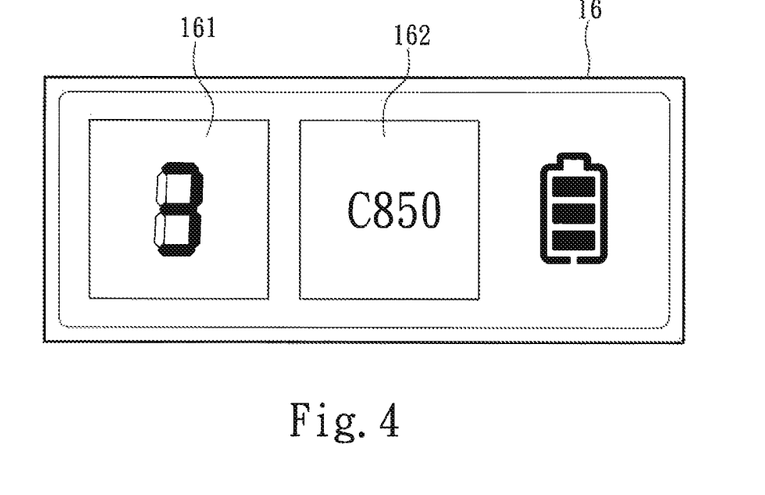
FIG. 4 is an enlarged schematic view of the display module in the first embodiment of the invention.

Execute step S4 according to requirement after step S3 is finished. The micro-control unit 13 outputs the transmission channel selection code to the display module 16, and also reads the corresponding device identification code from the memory unit 14 and sends it to the display module 16. The display module 16 displays the transmission channel selection code through the first display zone 161, and display the device identification code through the second display zone 162. Assumed that the device identification code of the information processing system 2 linked to the input device 1 is C850, then C850 is displayed on the second display zone 162.

Figure 5:
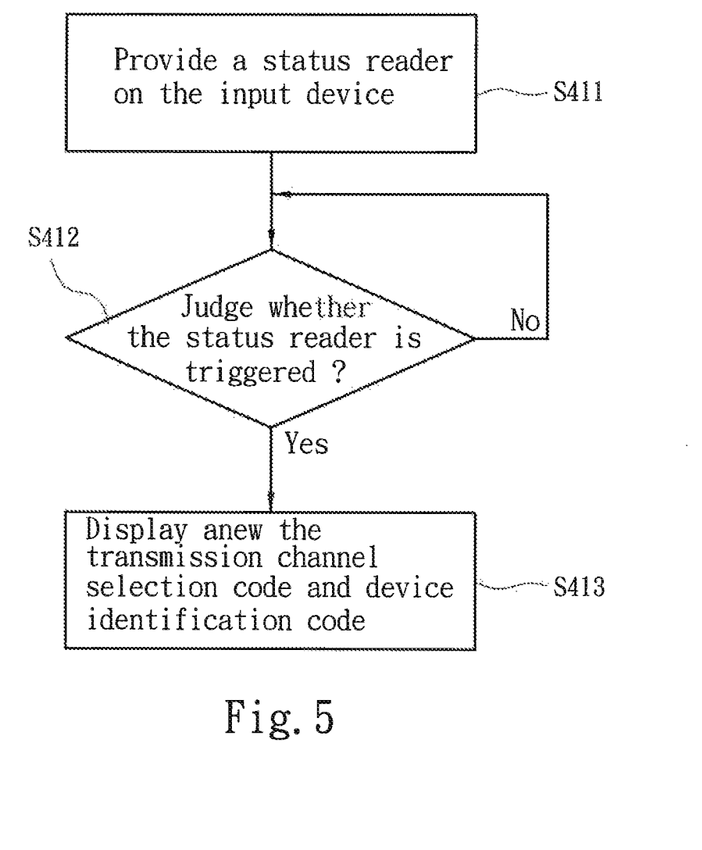
FIG. 5 is a flowchart of a second embodiment of the display method of the invention.
Figure 6:
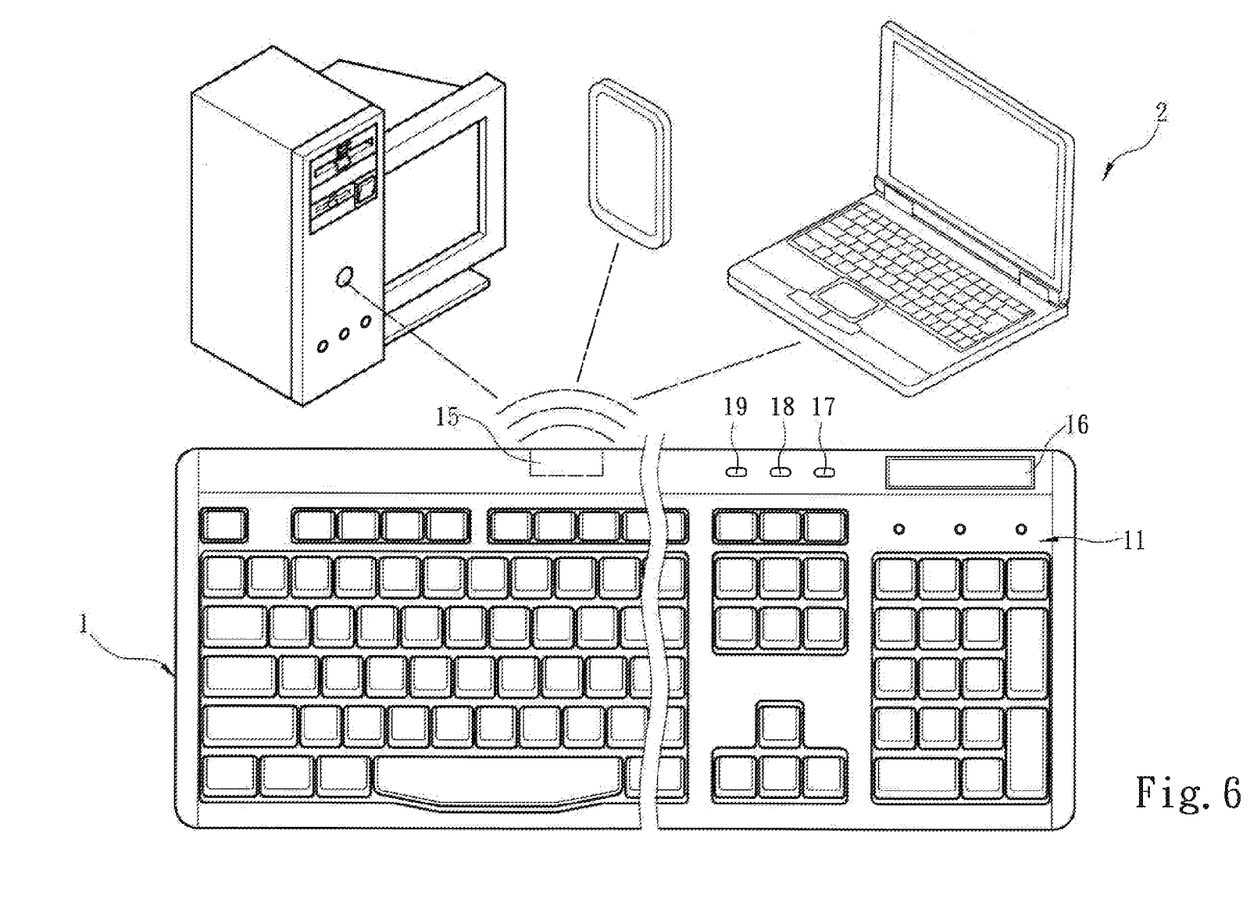
FIG. 6 is a schematic view for implementation of the second embodiment of the invention.
Figure 7:
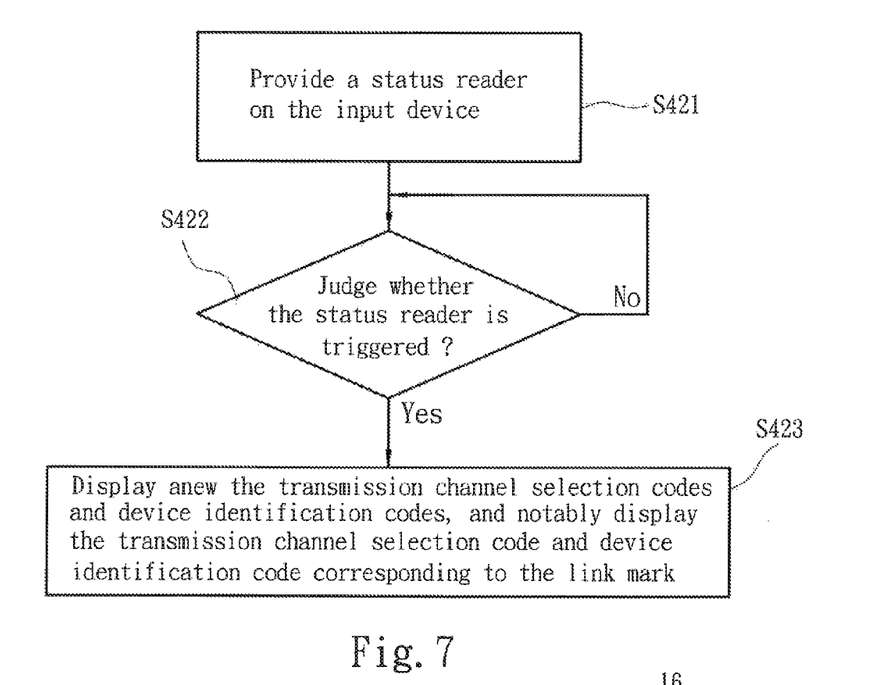
FIG. 7 is a flowchart of a third embodiment of the display method of the invention.
Figure 8:
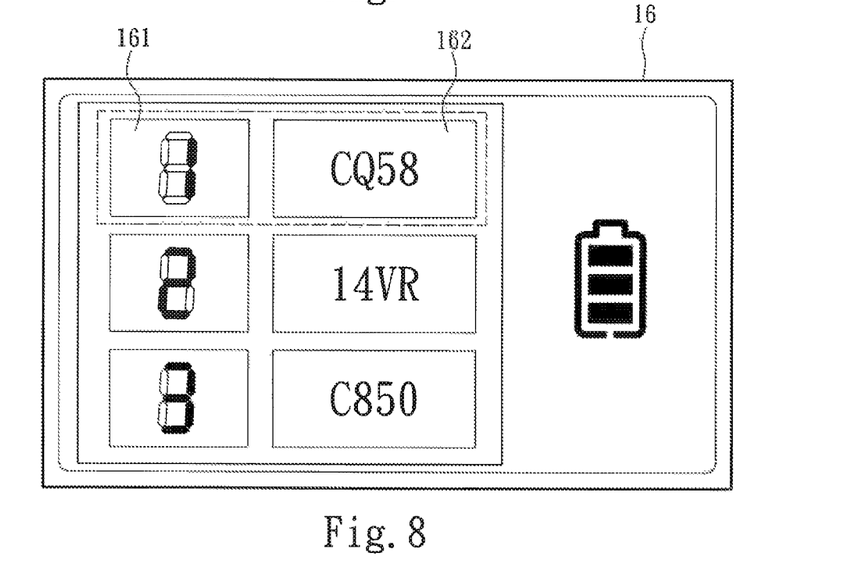
FIG. 8 is an enlarged schematic view of the display module in the third embodiment of the invention.

Please refer to FIGS. 5 and 6, in another embodiment, the step of displaying information of linked transmission channel further includes sub-steps as follows: a) sub-step S411: provide a status reader 17 on the input device 1; b) sub-step S412: judge whether the status reader 17 is triggered; if positive, read anew the transmission channel selection code linked to the input device 1 to read the corresponding device identification code and proceed the next step (sub-step S413); if negative, continue trigger judgment of the status reader 17; and c) sub-step S413: display anew the transmission channel selection code through the first display zone 161, and display anew the device identification code through the second display zone 162. More specifically, the input device 1 can have the status reader 17 installed thereon which can be a trigger switch triggered by depression itself or triggered by depression together with another depression of at least one key on the keyset 11. During execution of the sub-step S412, the micro-control unit 13 judges the electric signal generated by depression of the status reader 17 on the circuit unit 12; if positive, read anew the transmission channel selection code used in the current link, and read the device identification code corresponding to the transmission channel selection code to execute the sub-step S413; if negative, continue the judgment process. At sub-step S413 the display module 16 displays anew the transmission channel selection code and device identification code. In this embodiment the transmission channel selection code and device identification code are displayed individually. In another embodiment the input device 1 can display all the transmission channel selection codes and device identification codes through the status reader 17, and notably display the currently linked transmission channel selection code and device identification code. Whereas, the step of displaying information of linked transmission channel previously discussed can further include the following sub-steps: a) sub-step S421: provide the status reader 17 on the input device 1; b) sub-step S422: judge whether the status reader 17 is triggered; if positive, read anew the device identification codes and transmission channel selection codes registered in the input device 1, and set a link mark for the transmission channel selection code and device identification code linked to the input device 1; if negative, continue trigger judgment of the status reader 17; and c) sub-step 423: display the transmission channel selection codes and device identification codes respectively through the first display zone 161 and second display zone 162, and notably display the transmission channel selection code and device identification code corresponding to the link mark. Similarly, the status reader 17 is located on the input device 1. At sub-step S422, the micro-control unit 13 judges the electric signal generated by depression of the status reader 17 on the circuit unit 12; if the judgment is positive, read anew the device identification codes and transmission channel selection codes registered in the input device 1, and set a link mark for the transmission channel selection code and device identification code linked to the input device 1. Referring to FIG. 8, during execution of the sub-step S423, the display module 16 displays respectively the transmission channel selection codes and device identification codes through the first display zone 161 and second display zone 162, and further notably displays the corresponding transmission channel selection code and device identification code corresponding to the link mark. The notably display mentioned above can be shown by highlighting the data corresponding to the link mark in a reverse color or using different luminosity or colors for highlighting the data.

Figure 9:
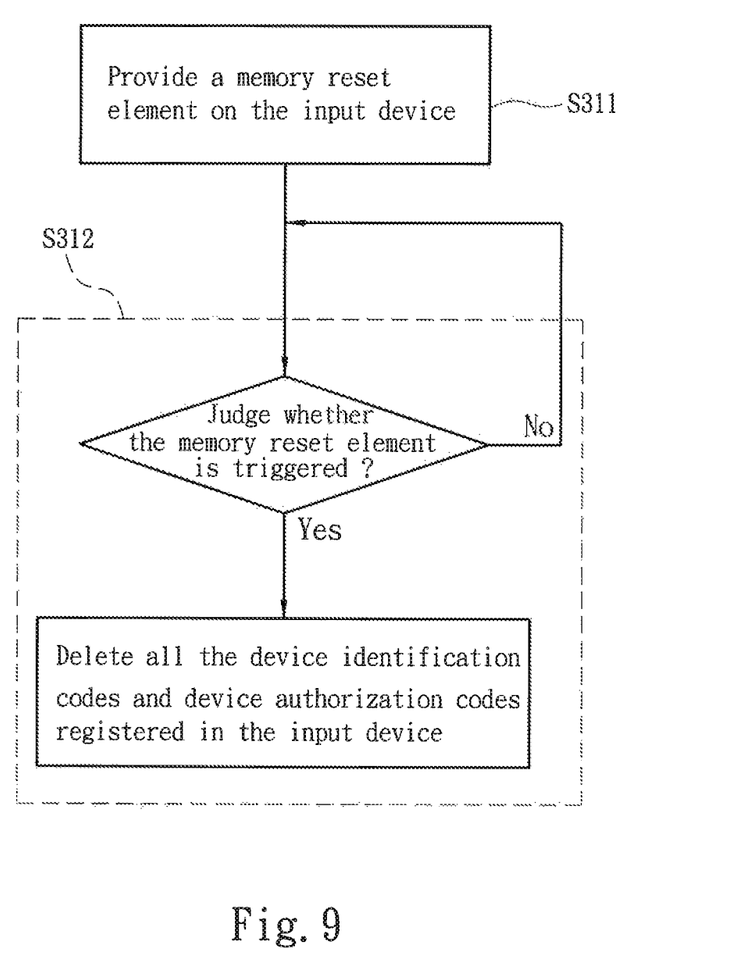
FIG. 9 is a flowchart of a fourth embodiment of the display method of the invention.
Figure 10:
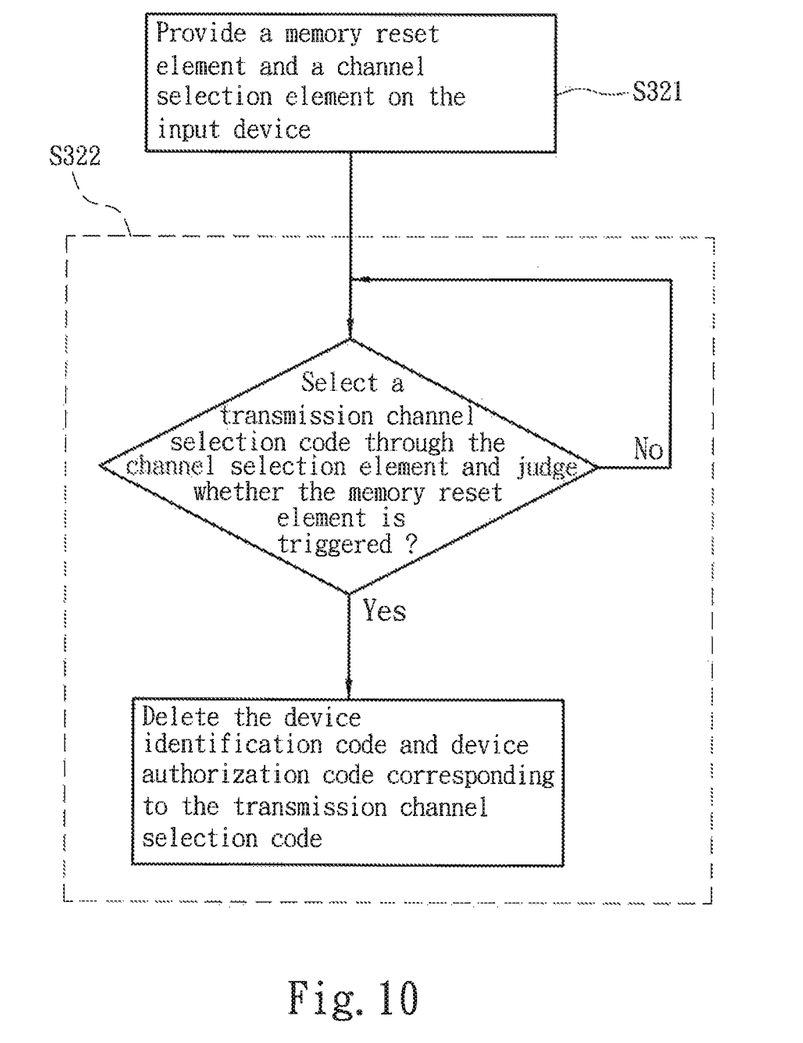
FIG. 10 is a flowchart of a fifth embodiment of the display method of the invention.

Please refer to FIGS. 6 and 9, the step of setting transmission channels can further includes sub-steps as follows: a) sub-step S311: provide a memory reset element 18 on the input device 1; and b) sub-step S312: judge whether the memory reset element 18 is triggered; if positive, delete the device identification codes and device authorization codes registered in the input device 1, and execute anew the step S2 of setting transmission channels; if negative, continue trigger judgment of the memory reset element 18. More specifically, implementation of the memory reset element 18 can be same as implementation of the status reader 17, i.e., the memory reset element 18 also can be triggered by depression itself or depression together with another depression of at least one key of the keyset 11 at the same time. At the sub-step S312, the micro-control unit 13 judges whether the electric signal is generated by depression of the memory reset element 18 on the circuit unit 12; if positive, delete all the device identification codes and device authorization codes registered in the input device 1, and execute anew the step S2 of setting transmission channels; if negative, the micro-control unit 13 continues the judgment. While the embodiment previously discussed takes deleting all the device identification codes and device authorization codes as an example, it is not the limitation of the invention. The individual device identification code and device authorization code corresponding to one transmission channel selection code can be selectively deleted. Also referring to FIGS. 6 and 10, in yet another embodiment, the step of setting transmission channels can further includes sub-steps as follows: a) sub-step S321: provide the memory reset element 18 and a channel selection element 19 on the input device 1; and b) sub-step S322: select the transmission channel selection code through the channel selection element 19, and judge whether the memory reset element 18 is triggered; if positive, delete the device identification code and device authorization code corresponding to the transmission channel selection code, and execute anew the step S2 of setting transmission channels; if negative, continue trigger judgment of the memory reset element 18. In this embodiment the memory reset element 18 and channel selection element 19 are located on the input device 1. The channel selection element 19 can be a key on the keyset 11 or a trigger element on the input device 1. At sub-step S322, the micro-control unit 13 judges first whether the channel selection element 19 is triggered; if positive, judge the corresponding transmission channel selection code generated by trigger of the channel selection element 19, and then judge whether the memory reset element 18 is triggered; if positive, delete the device identification code and device authorization code corresponding to the transmission channel selection code, and execute anew the step S2 of setting transmission channels. The process is same as previously discussed, hence details are omitted herein.

As a conclusion, the display method for distinguishing multiple linking targets of the invention mainly switches data transmission link between an input device and at least two information processing systems through a plurality of transmission channels in a wireless transmission fashion. The input device includes a display nodule with a first display zone and a second display zone. The display method comprises steps of: detecting linkable information processing systems; setting transmission channels; determining a linking target; and displaying information of linked transmission channel. Through the steps of detecting linkable information processing systems, setting transmission channels and determining a linking target, a data transmission link can be established with one of the information processing systems. Users can further display the device identification code through the step of displaying information of linked transmission channel to be informed of the information processing system currently linked to the input device, thereby can resolve the problem of unable to identify the currently linking target happened to the conventional multi-target switch input device to result in blind switching.

What is claimed is:

1. A display method for distinguishing multiple linking targets to switch data transmission link between an input device and at least two information processing systems through a plurality of transmission channels in a wireless transmission fashion, the input device including a display module with a first display zone and a second display zone, the display method comprising the steps of:
    step 1: activating a detection mode for a linking target to detect the linkable information processing systems;
    step 2: getting a device identification code and a device authorization code of each information processing system, and setting a transmission channel selection code corresponding to the device identification code and the device authorization code for reading thereof;
    step 3: reading the corresponding device identification code and the device authorization code through the transmission channel selection code generated by selection of a user to establish a data transmission link between the corresponding transmission channel and the information processing system; and
    step 4: getting the generated transmission channel selection code and the corresponding device identification code through the display module, and displaying the transmission channel selection code through the first display zone and displaying the device identification code through the second display zone.

2. The display method of claim 1, wherein the step 3 further includes the sub-steps of:
    a. providing a memory reset element on the input device; and
    b. judging whether the memory reset element is triggered; if yes, the device identification codes and the device authorization codes registered in the input device are deleted and the step 2 is executed anew; if not, trigger judgment of the memory reset element is executed continuously.

3. The display method of claim 1, wherein the step 3 further includes the sub-steps of:
    a. providing a memory reset element and a channel selection element on the input device; and
    b. selecting the transmission channel selection code through the channel selection element and judging whether the memory reset element is triggered; if yes, the device identification code and the device authorization code corresponding to the transmission channel selection code are deleted and the step 2 is executed anew; if not, trigger judgment of the memory reset element is executed continuously.

4. The display method of claim 1, wherein the step 4 further includes the sub-steps of:
    a. providing a status reader on the input device;
    b. judging whether the status reader is triggered; if yes, the transmission channel selection code linked to the input device is read anew to read the corresponding device identification code and proceed the next step; if not, trigger judgment of the status reader is executed continuously; and
    c. displaying anew the transmission channel selection code through the first display zone and displaying anew the device identification code through the second display zone.

5. The display method of claim 1, wherein the step 4 further includes the sub-steps of:
    a. providing a status reader on the input device;
    b. judging whether the status reader is triggered; if yes, the device identification codes and the transmission channel selection codes registered in the input device are read anew and a link mark is set for the transmission channel selection code and the device identification code linked to the input device; if not, trigger judgment of the status reader is executed continuously; and
    c. displaying the transmission channel selection codes and the device identification codes respectively through the first display zone and the second display zone, and notably displaying the transmission channel selection code and the device identification code corresponding to the link mark.

6. The display method of claim 1, wherein the wireless transmission fashion is Bluetooth transmission technique.

7. The display method of claim 1 wherein the input device is a keyboard.

8. The display method of claim 7, wherein the keyboard includes a keyset, a circuit unit to generate electric signals by depression of the keyset, a micro-control unit connected to the display module and electrically connected to the circuit unit to detect the electric signals, a memory unit electrically connected to the micro-control unit and a wireless transmission device connected to the micro-control unit;
    wherein the memory unit stores at least the device identification code, the device authorization code and the corresponding transmission channel selection code, the micro-control unit detecting the transmission channel selection code generated by the circuit unit to read the corresponding device identification code and the device authorization code from the memory unit, the display module displaying the transmission channel selection code and the device identification code, the wireless transmission device establishing the data transmission link with the corresponding information processing system through the device identification code and the device authorization code corresponding to the transmission channel selection code.

9. The display method of claim 8, wherein the keyboard includes a status reader which incorporates with at least one key of the keyset to make the display module display anew the transmission channel selection code and the device identification code.

10. The display method of claim 8, wherein the keyboard includes a memory reset element which incorporates with at least one key of the keyset to make the keyboard delete the registered device identification codes and the device authorization codes.

11. The display method of claim 1, wherein the information processing system is a computer.

12. The display method of claim 11, wherein the computer is a notebook computer.

13. The display method of claim 1, wherein the information processing system is a handset.

* * * * *